US012135167B2

(12) United States Patent
Hulbert et al.

(10) Patent No.: US 12,135,167 B2
(45) Date of Patent: Nov. 5, 2024

(54) GRAIN DRYING AUGER AND DRUM WITH AIR HOLES

(71) Applicant: DryAir LLC, Eagle, ID (US)

(72) Inventors: David Hulbert, Eagle, ID (US); Devon John McDonald, Eagle, ID (US)

(73) Assignee: DRYAIR LLC, Eagle, ID (US)

( * ) Notice: Subject to any disclaimer, the term of this patent is extended or adjusted under 35 U.S.C. 154(b) by 498 days.

(21) Appl. No.: 16/036,589

(22) Filed: Jul. 16, 2018

(65) Prior Publication Data

US 2019/0024974 A1 Jan. 24, 2019

Related U.S. Application Data

(60) Provisional application No. 62/535,121, filed on Jul. 20, 2017.

(51) Int. Cl.

| | |
|---|---|
| ***F26B 17/22*** | (2006.01) |
| ***F26B 3/06*** | (2006.01) |
| ***F26B 11/04*** | (2006.01) |
| ***F26B 17/20*** | (2006.01) |
| ***F26B 21/08*** | (2006.01) |
| ***F26B 25/08*** | (2006.01) |

(52) U.S. Cl.

CPC ................ *F26B 17/22* (2013.01); *F26B 3/06* (2013.01); *F26B 11/04* (2013.01); *F26B 17/20* (2013.01); *F26B 21/083* (2013.01); *F26B 25/08* (2013.01); *F26B 2200/06* (2013.01)

(58) Field of Classification Search

CPC ........ F26B 17/22; F26B 21/083; F26B 25/08; F26B 3/06; F26B 17/20; F26B 11/04; F26B 2200/06

See application file for complete search history.

(56) References Cited

U.S. PATENT DOCUMENTS

| | | | | |
|---|---|---|---|---|
| 160,649 A * | 3/1875 | Clark | B01F 7/00416 432/154 |
| 1,534,737 A * | 4/1925 | Reed | B01J 19/20 432/18 |
| 2,399,246 A | 4/1946 | Patrick, Jr. et al. | |
| 2,399,247 A | 4/1946 | Patrick, Jr. et al. | |

(Continued)

FOREIGN PATENT DOCUMENTS

| | | |
|---|---|---|
| CN | 1175998 | 9/2003 |
| CN | 201797961 | 4/2011 |

(Continued)

OTHER PUBLICATIONS

International Search Report and Written Opinion for PCT/US2018/042482 mailed Oct. 9, 2018, 13 pages.

(Continued)

*Primary Examiner* — Jessica Yuen

(74) *Attorney, Agent, or Firm* — RAY QUINNEY & NEBEKER P.C.; Paul N. Taylor

(57) ABSTRACT

In some embodiments, a grain drying apparatus may include a drum with a grain auger including a flighting with air holes. The drum may be surrounded by an outer drum, the inner drum including a plurality of drum air holes. A volume of dehydrated air may pass around a helical air diverter, located in an annulus between the inner drum and the outer drum, and through the grain, thereby drying the grain.

20 Claims, 9 Drawing Sheets

(56) References Cited

U.S. PATENT DOCUMENTS

| | | | | | |
|---|---|---|---|---|---|
| 2,887,788 | A | | 5/1959 | Baxter et al. | |
| 3,628,966 | A | * | 12/1971 | Katsuya | A23L 7/101 426/302 |
| 3,868,469 | A | | 2/1975 | Chalin | |
| 4,010,552 | A | | 3/1977 | Peterson | |
| 4,038,021 | A | | 7/1977 | Benson | |
| 4,189,848 | A | | 2/1980 | Ko et al. | |
| 4,217,701 | A | | 8/1980 | Mathews | |
| 4,750,273 | A | * | 6/1988 | Parkes | F26B 25/22 34/484 |
| 4,821,428 | A | * | 4/1989 | Good | F26B 23/002 34/86 |
| 4,862,601 | A | | 9/1989 | Baillie | |
| 4,974,337 | A | * | 12/1990 | Tavakoli | F26B 21/06 34/471 |
| 5,468,122 | A | * | 11/1995 | Van Fossen | F26B 9/063 34/181 |
| 5,979,170 | A | | 11/1999 | Thorpe | |
| 6,646,181 | B1 | | 11/2003 | Eastin | |
| 8,652,555 | B2 | | 2/2014 | Thomas | |
| 8,713,815 | B2 | * | 5/2014 | Abramov | F26B 7/00 34/412 |
| 2002/0040643 | A1 | | 4/2002 | Ware | |
| 2002/0139006 | A1 | | 10/2002 | Damiani | |
| 2006/0130357 | A1 | | 6/2006 | Long, Jr. | |
| 2008/0022547 | A1 | | 1/2008 | Shivvers | |
| 2009/0056162 | A1 | * | 3/2009 | McMahon, Jr. | F26B 17/12 34/511 |
| 2014/0325862 | A1 | * | 11/2014 | O'Shea | F26B 21/004 34/89 |
| 2015/0153051 | A1 | * | 6/2015 | Pahwa | F24F 3/1423 95/10 |
| 2015/0210927 | A1 | | 7/2015 | Hall | |

FOREIGN PATENT DOCUMENTS

| | | | | |
|---|---|---|---|---|
| CN | 103392795 | | | 1/2015 |
| CN | 204317435 | | | 5/2015 |
| CN | 204362846 | | | 6/2015 |
| CN | 204415749 | | | 6/2015 |
| CN | 104833193 | | | 8/2015 |
| CN | 204519104 | | | 8/2015 |
| CN | 105581353 | | | 5/2016 |
| CN | 105605913 | | | 5/2016 |
| CN | 205250252 | | | 5/2016 |
| CN | 206005746 | | | 3/2017 |
| GB | 856947 | | | 12/1960 |
| GB | 909889 | | | 11/1962 |
| GB | 1416748 | | | 12/1975 |
| JP | H03123450 | | | 5/1991 |
| JP | H0568897 | | | 8/1991 |
| JP | 05068897 | A | * | 3/1993 |
| JP | 2000161857 | | | 6/2000 |
| JP | 2009213357 | | | 9/2009 |
| KR | 20060001853 | | | 1/2006 |
| RU | 2323580 | | | 5/2009 |
| RU | 2365836 | | | 8/2009 |
| RU | 2371650 | | | 10/2009 |
| RU | 169186 | | | 3/2017 |
| WO | WO2009095693 | | | 8/2009 |

OTHER PUBLICATIONS

U.S. Appl. No. 62/535,121, filed Jul. 20, 2017, Hulbert, et al.

Bal, Lm, et al., "Solar Dryer with Thermal Energy Storage Systems for Drying Agricultural Food Products: a Review", Renewable and Sustainable Energy Reviews; 14(8), published Oct. 31, 2010, pp. 2298-2314.

"Conveyor Dryers Continuous Multi-zone for Minimum Physical Drying Attrition", accessed from http://www.drytecheng.com/Conveyor.htm, accessed on May 8, 2018, 2 pages.

"Drying of Food", accessed from https://www.slideshare.net/DebomitraDey/drying-of-food-83742616, accessed on May 8, 2018, 23 pages.

"Fish Feed Dryer", accessed from https://www.fish-feed-extruder.com/product/mesh-belt-pellet-dryer.html, accessed on May 9, 2018, 6 pages.

"Fruit and Vegetable Drying"; accessed from http://processsystems.sandvik.com/applications/fruit-and-vegetable-drying/, accessed on May 8, 2018, 5 pages.

"Hopper Auger Conveyer System Used to Feed the Sieves", retrieved from http://www.alibaba.com/product-detail/Hopper-auger-conveyor-system-used-to_60671957623.html; Date Accessed May 12, 2017, 18 pages.

Thoruwa, Tfn, et al., "A Solar-regenerated Desiccant Dehumidifier for the Aeration of Stored Grain in the Humid Tropics", Journal of Agricultural Engineering Research; 71(3), published Nov. 1, 1998, pp. 257-262.

First Office Action in Chinese Application No. 201880059879.3, mailed Mar. 31, 2021, 8 pages.

Second Office Action in Chinese Application No. 201880059879.3, mailed Oct. 20, 2021, 11 pages.

First Office Action in European Application No. 18749984.3, mailed Sep. 18, 2023, 3 pages.

First Office Action in Brazilian Application BR112020001149-5, mailed Sep. 7, 2022, 6 pages.

First Office Action in Mexican Application No. MX/a/2020/000750, mailed Sep. 27, 2023, 11 pages.

Second Office Action in Mexican Application No. MX/a/2020/000750, mailed U.S. Appl. No. 03/202,024, 8 pages.

First Examination Report in Australian Application No. 2018304164, mailed Jun. 30, 2023, 4 pages.

* cited by examiner

GRAIN DRYING AUGER AND DRUM WITH AIR HOLES

CROSS-REFERENCE TO RELATED APPLICATIONS

This application claims the benefit of and priority to U.S. Provisional Patent Application Ser. No. 62/535,121, filed Jul. 20, 2017, which is hereby incorporated by reference in its entirety.

BACKGROUND

To prevent spoilage through mold and/or rot, the moisture content of grain may be reduced through a drying process. A conventional drying process may include heating the grains for a period of time to drive moisture from the grain. Heating may occur using electricity, fossil fuel, solar energy, or other means for heating.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, a grain drying apparatus may include a drum with a grain inlet at a first end and a grain outlet at a second end. The drum may include a grain auger, which includes a flighting supported by a shaft. The flighting may include a plurality of air holes located at least at the grain inlet, but which may be located along an entirety of a length of the fighting. A ventilation device may be in fluid communication with a dehumidifying unit and the drum. The dehumidifying unit may include a desiccant of activated alumina, silica gel, or a molecular sieve.

In other embodiments, a grain drying apparatus may include an inner drum and an outer drum. The inner drum may include a grain inlet at a first end and a grain outlet at a second end. A wall of the inner drum may include a plurality of drum air holes. A helical air diverter may be located in an annulus between the inner drum and the outer drum. A ventilation device may be in fluid communication with a dehumidifying unit and the drum. The dehumidifying unit may include a desiccant of activated alumina, silica gel, or a molecular sieve.

In yet other embodiments, a method for drying grain includes loading grain into an inner drum at a first end, passing a volume of air through a dehumidifying unit to an intake at an annulus between the inner drum and an outer drum, dehumidifying the volume of air in the dehumidifying unit, moving grain through the inner drum to a grain outlet at a second end, diverting the volume of air through drum air holes in a wall of the inner drum, and exhausting the volume of air through an exhaust.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is another partial cutaway side schematic overview of a drying apparatus, according to at least one embodiment of the present disclosure;

FIG. 2-1 through 2-3 are lateral cross-sectional views of a fighting of a grain auger, according to at least one embodiment of the present disclosure;

FIG. 3 is a longitudinal cross-sectional segment view of a grain auger in a drum, according to at least one embodiment of the present disclosure;

DETAILED DESCRIPTION

This disclosure generally relates to material drying apparatuses and methods to dry foodstuffs, such as grain. Although this disclosure repeatedly uses the word "grain" when referring to elements and embodiments of the present disclosure (e.g., "grain drying apparatus 100," "grain auger 104," "grain inlet 112," "grain outlet 118"), the use of the word "grain" should not be interpreted as limiting this disclosure in any way for use with grains. Embodiments of the present disclosure may include other foodstuffs, including bulbs, vegetables, fruit, and other foodstuffs that are typically dried before storage, sale, and/or transportation.

Figure 1:
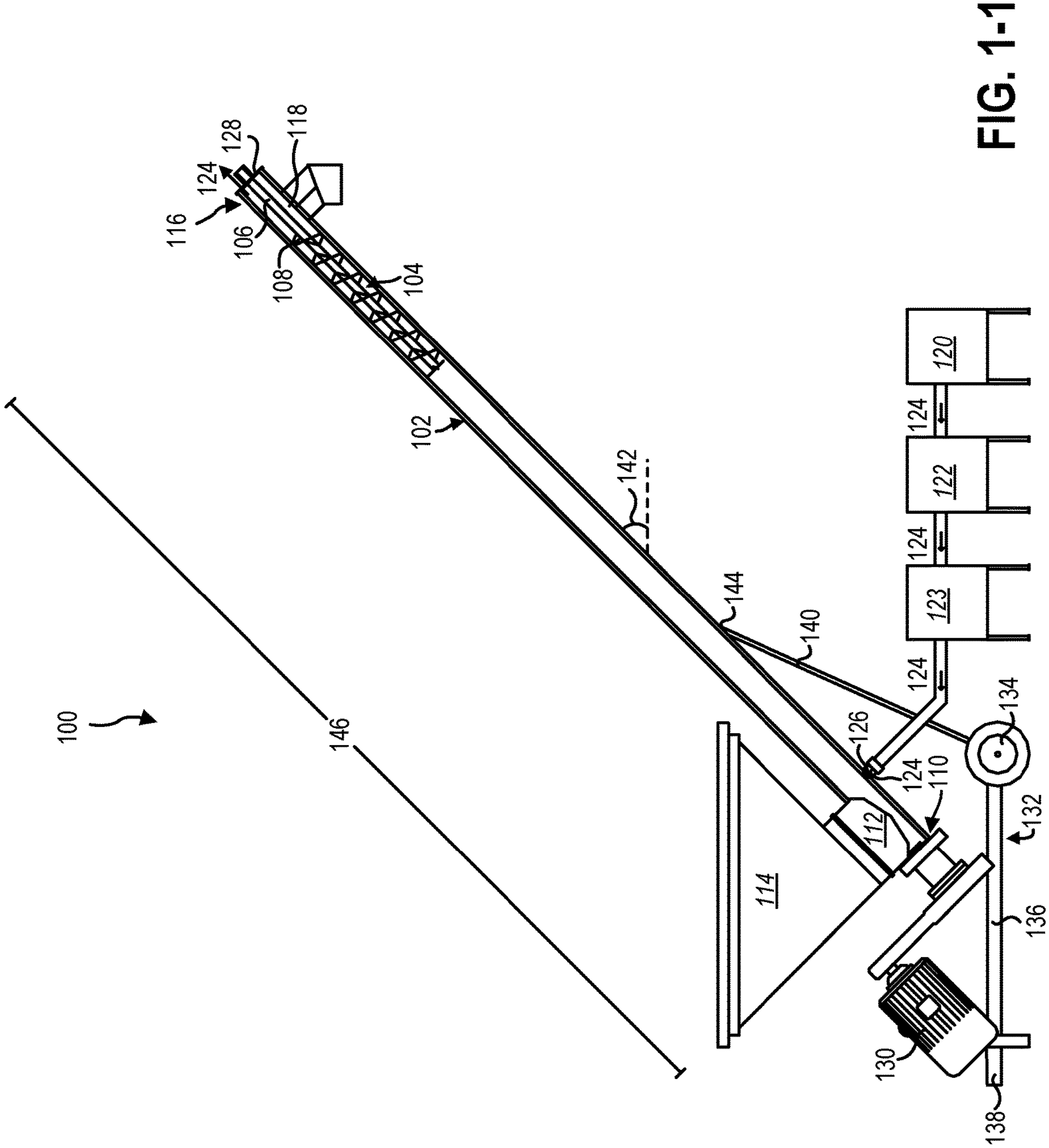
FIG. 1-1 is a partial cutaway side schematic overview of a grain drying apparatus, according to at least one embodiment of the present disclosure.

Referring now to FIG. 1-1, in some embodiments, a grain drying apparatus 100 may include a drum 102. Inside the drum 102 may be a grain auger 104, including a fighting 108 supported by a shaft 106. At a first end 110 of the drum 102 may be a grain inlet 112. In some embodiments, the grain inlet 112 may include a hopper 114. At a second end 116 of the drum 102 may be a grain outlet 118.

In some embodiments, a ventilation device 120 may be in fluid communication with a dehumidifying unit 122 and a chiller 123. The ventilation device 120, dehumidifying unit 122, and chiller 123 may be in fluid communication with the drum 102. In some embodiments, the drum 102 may be under positive pressure from the ventilation device 120. For example, the ventilation device 120 may blow a volume of air 124 through the dehumidifying unit 122 and chiller 123 and through an intake 126 located at the first end 110 of the drum 102. The volume of air 124 may then flow through the drum 102 and out through an exhaust 128 at the second end 116. In some embodiments, the volume of air 124 may exhaust out of the grain outlet 118.

In other embodiments, the volume of air (e.g., volume of air 124) may flow in a different path. For example, the drum (e.g., drum 102) may be under negative pressure from the ventilation device (e.g., ventilation device 120). For example, a volume of air may flow through a dehumidifying unit (e.g., dehumidifying unit 122) and a chiller (e.g., chiller 123) and into an intake located near the grain outlet (e.g., grain outlet 118) at the second end 116 of the drum. The volume of air may then pass through the drum, and out an exhaust near the grain inlet (e.g., grain inlet 112) at the first end 110 of the drum, before being pulled through the ventilation device (e.g., ventilation device 120). In some embodiments, the volume of air may exhaust out of the grain inlet (e.g., grain inlet 112).

In some embodiments, the ventilation device 120 may have a volumetric flow rate in a range having an upper value, a lower value, or upper and lower values including any of 100 cubic meters per hour, 250 cubic meters per hour, 500 cubic meters per hour, 750 cubic meters per hour, 1,000 cubic meters per hour, 1,500 cubic meters per hour, 2,000 cubic meters per hour, 2,500 cubic meters per hour, 3,000 cubic meters per hour, or any values therebetween. For example, the volumetric flow rate may be greater than 100 cubic meters per hour. In other examples, the volumetric flow rate may be less than 3,000 cubic meters per hour. In yet other examples, the volumetric flow rate may be in a range of 100 cubic meters per hour to 3,000 cubic meters per hour.

In some embodiments, the rate of grain drying may be related to the volumetric flow rate. For example, a higher volumetric flow rate may increase the rate of grain drying. Additionally, a higher volumetric flow rate may have greater air penetration through grain in the grain auger, or in other words, a higher volumetric flow rate may increase the volume of air that flows through the grain. In other examples, a lower volumetric flow rate may decrease the rate of grain drying. A lower volumetric flow rate may increase the drying efficiency of the air, or in other words, each cubic meter of air may absorb more moisture at a lower volumetric flow rate. By changing the volumetric flow rate, the drying efficiency, volume of air flowing through the grain, and drying rate may be adjusted.

In some embodiments, the ventilation device 120 may have a pressure head, where the pressure head is a gauge pressure, relative to the atmospheric pressure, in a range having an upper value, a lower value, or upper and lower values including any of 50 Pascal (Pa), 100 Pa, 200 Pa, 300 Pa, 400 Pa, 500 Pa, 600 Pa, 700 Pa, 800 Pa, 900 Pa, 1,000 Pa, or any values therebetween. For example, the pressure head may be greater than 50 Pa. In other examples, the pressure head may be less than 1,000 Pa. In yet other examples, the pressure head may be in a range of 50 Pa to 1,000 Pa.

In some embodiments, the pressure head may be related to the volumetric flow rate. For example, a high-pressure head may result in a higher volumetric flow rate. In other embodiments, a low-pressure head may result in a lower volumetric flow rate. In some embodiments, the amount of grain in the grain dryer may change the ventilation resistance through the grain dryer. For example, a greater amount of grain in the grain dryer may require a higher-pressure head to maintain the same volumetric flow rate. Similarly, a lower amount of grain in the grain dryer may require a lower-pressure head to maintain the same volumetric flow rate. In some embodiments, the pressure head may be adjusted using a variable frequency drive (VFD) on the ventilation device 120. In this manner, a constant volumetric flow rate may be maintained independent of the amount of grain in the grain dryer. In other embodiments, the volumetric flow rate may vary based on pressure head (and the amount of grain in the grain dryer).

Still referring to FIG. 1-1, in some embodiments, the dehumidifying unit 122 may dehumidify at least a portion of the volume of air 124 using a desiccant. In some embodiments, the desiccant may include at least one of activated alumina, silica gel, or a molecular sieve. In other embodiments, the desiccant may include other desiccants. In some embodiments, the dehumidifying unit 122 may include a twin tower desiccant dryer. In a twin tower desiccant dryer, a first tower is active, drying air that is passed over a charged or partially charged desiccant. A second tower includes a desiccant that is hydrated or partially hydrated. A portion of the dehydrated air may pass through the second tower to recharge the second tower. After the first tower is hydrated or partially hydrated, and the second tower is recharged or partially recharged, the rolls of the towers may be reversed, and the second tower may dehumidify at least a portion of the volume of air and the first tower may be recharged.

In some embodiments, the dehumidifying unit 122 may include the chiller 123. In other words, the dehumidifying unit 122 and the chiller 123 may be incorporated into a single unit. In this manner, the portion of the volume of air 124 air may be simultaneously dehumidified and chilled. Thus, the grain drying apparatus 100 may have a single combined dehumidifying unit/chiller.

In some embodiments, the desiccant may be recharged using solar energy during the day. For example, radiant heat from the sun may heat the desiccant sufficiently to recharge it. In other examples, the dehumidifying unit 122 may include a dark-colored (e.g., black) exterior, which may absorb solar energy, heating the interior of the dehumidifying unit 122 and recharging the desiccant. In other embodiments, the desiccant may be recharged using electric energy. For example, electricity may power resistive heaters, which may heat the desiccant sufficiently for recharging. In some examples electricity may be provided by the standard electric grid. In other examples, electricity may be provided by batteries that may be located on or near the grain dryer. In still other examples, electricity may be provided by solar power panels. In some embodiments, a fossil fuel heater may recharge the desiccant. For example, a natural gas burner may heat the dehumidifying unit 122 to recharge the desiccant. In other examples, an oil burner, diesel burner, gasoline burner, or other fossil fuel heater may recharge the desiccant.

In some embodiments, the volume of air 124 may be exhausted out the exhaust 128 and into the atmosphere. In other embodiments, the volume of air 124 may be captured at the exhaust 128 and diverted for other uses. For example, the volume of air 124 may be heated and used to regenerate the desiccant.

In some embodiments, the shaft 106 of the grain auger 104 may be connected to an electric motor 130. The electric motor 130 may rotate the shaft 106 and the grain auger 104. Rotating the grain auger 104 may move grain through the drum 102 from the grain inlet 112 to the grain outlet 118. In some embodiments, the grain auger 104 may be a shaftless grain auger. For example, the shaftless grain auger may include a fighting (e.g. fighting 108) that is self-supporting, and is not supported by a shaft.

The amount of grain that moves through the drum 102 may be at least partially dependent upon the rotational velocity of the grain auger 104. In some embodiments, the rotational velocity may be in a range having an upper value, a lower value, or upper and lower values including any of 5 rotations per minute (rpm), 10 rpm, 50 rpm, 100 rpm, 150 rpm, 200 rpm, 250 rpm, 300 rpm, 350 rpm, 400 rpm, 450 rpm, 500 rpm, 550 rpm, 600 rpm, 650 rpm, 700 rpm, 750 rpm, 800 rpm, or any values therebetween. For example, the rotational velocity may be greater than 5 rpm. In other examples, the rotational velocity may be less than 800 rpm. In yet other examples, the rotational velocity may be in a range of 5 rpm to 800 rpm.

In some embodiments, the grain auger 104 may have a conveying capacity in a range having an upper value, a lower value, or upper and lower values including any of 100 bushels per hour, 250 bushels per hour, 500 bushels per hour, 750 bushels per hour, 1,000 bushels per hour, 1,250 bushels per hour, 1,500 bushels per hour, 1,750 bushels per hour, 2,000 bushels per hour, or any values therebetween. For example, the conveying capacity may be greater than 100 bushels per hour. In other examples, the conveying capacity may be less than 2,000 bushels per hour. In yet other examples, the conveying capacity may be in a range of 100 bushels per hour to 2,000 bushels per hour.

In some embodiments, the conveying capacity may be equal to a drying capacity of the system. In other embodiments, the drying capacity may be different than the conveying capacity. For example, the drying capacity may be greater than the conveying capacity. In other examples, the drying capacity may be less than the conveying capacity. In some embodiments, the type of grain being dried may determine the drying capacity and the conveying capacity.

In some embodiments, the volumetric flow rate of the fan may be altered to match the drying capacity to the conveying capacity. For example, the ventilation device 120 may have an adjustable fan blade pitch. Increasing or decreasing the fan blade pitch may increase or decrease the volumetric flow rate. In other examples, the ventilation device 120 may have a variable fan rotational velocity. An increased fan rotational velocity may increase the volumetric flow rate, and a decreased fan rotational velocity may decrease the volumetric flow rate. For example, the ventilation device 120 may include a variable frequency drive (VFD). Adjusting the VFD may adjust the rotational speed of a fan in the ventilation device 120. In other examples, a fan may include a plurality of pre-set rotational speeds. The plurality of pre-set rotational speeds may be adjusted through a system of gears or other means for adjusting pre-set rotational speeds.

In some embodiments, the conveying capacity may be altered to match to drying capacity. For example, the grain auger 104 may have an adjustable rotational velocity. An increased rotational velocity may increase the conveying capacity, while a decreased rotational velocity may decrease the conveying capacity. In some embodiments, electric motor 130 may include a VFD. Adjusting the VFD may adjust the rotational speed of the grain auger 104. In some embodiments, the electric motor 130 may include a plurality of pre-set rotational speeds. The plurality of pre-set rotational speeds may be adjusted through a system of gears or other means for adjusting pre-set rotational speeds.

Still referring to FIG. 1-1, in some embodiments, the drum 102 may be rotationally fixed to the grain auger 104. For example, the electric motor 130 may rotate the drum 102 simultaneously with the grain auger 104. In other embodiments, the grain auger 104 may rotate independently of the drum 102.

In some embodiments, the grain drying apparatus 100 may be permanently installed in one location. In other embodiments, the grain drying apparatus 100 may be installed on a mobile platform 132. For example, the mobile platform 132 may be mounted on a trailer and configured to be pulled by a vehicle (e.g., a commercial vehicle, personal vehicle, a tractor). The mobile platform 132 may include a set of wheels 134, a frame 136, and a hitch 138.

In some embodiments, a conveyor support 140 may support the drum 102 at a conveyor angle 142 in a range having an upper value, a lower value, or upper and lower values including any of 0°, 10°, 20°, 30°, 40°, 50°, 60°, 70°, 80°, 90°, or any values therebetween. For example, the conveyor angle 142 may be greater than 0°. In other examples, the conveyor angle 142 may be less than 90°. In yet other examples, the conveyor angle 142 may be in a range of 0° to 90°. In some embodiments, the conveyor support 140 may be attached to the drum 102 at an adjustable location 144. The adjustable location 144 may be adjusted to adjust the conveyor angle 142. For a fixed-length conveyor support 140, an adjustable location 144 closer to the first end 110 may result in a larger conveyor angle 142. An adjustable location 144 closer to the second end 116 may result in a smaller conveyor angle 142.

In some embodiments, the drum 102 may have a drum length 146 in a range having an upper value, a lower value, or upper and lower values including any of 3 m, 10 m, 20 m, 30 m, 40 m, 50 m, 60 m, 70 m, 80 m, 90 m, 100 m, or any values therebetween. For example, the drum length 146 may be greater than 3 m. In other examples, the drum length 146 may be less than 100 m. In yet other examples, the drum length 146 may be in a range of 3 m to 100 m.

Still referring to FIG. 1-1, the grain drying apparatus 100 operates at an operating temperature. In some embodiments, the grain drying apparatus 100 may include only a dehumidifier, without a chiller. Thus, the operating temperature may be approximately equal to the ambient air temperature. Ambient air, at an ambient air temperature, may be passed through the dehumidifying unit 122. Drying the portion of the volume of air 124 in the dehumidifying unit 122 may increase at least a portion of the air temperature of the volume of air 124. The air temperature of the portion of the volume of air 124 that enters the drum 102 may therefore be higher than, but approximately equal, to the ambient air temperature.

In some embodiments, the chiller 123 may be located between the dehumidifying unit 122 and the inlet 112. The chiller 123 may cool at least a portion of the volume of air 124 to the operating temperature. In some embodiments, the operating temperature may be less than 8° C. The conventional approach to grain drying indicates that a warmer volume of air (e.g., volume of air 124) will dry grain faster. In contrast, in at least one embodiment of the present disclosure, the Inventors have found that a cooler volume of air (e.g., volume of air 124) may dry grain faster. Cooler volumes of air allow for a lower moisture content than warmer volumes of air. Thus, in at least some embodiments, desiccating the portion of the volume of air followed by chilling the portion of the volume of air may allow for a lower moisture content in the volume of air. Thus, a cooler operating temperature may enable faster drying of the grain.

In some embodiments, the operating temperature may be in a range having an upper value, a lower value, or upper and lower values including any of 0° C., 0.1° C., 0.25° C., 0.5° C., 1° C., 2° C., 4° C., 6° C., 8° C., 10° C., 20° C., 30° C., 40° C., 50° C., 60° C., or any values therebetween. For example, the operating temperature may be greater than 0° C. In other examples, the operating temperature may be less than 60° C. In yet other examples, the operating temperature may be in a range of 0° C. to 60° C. In further examples, the operating temperature may be less than 0° C. In some embodiments, the operating temperature may be between 0° C. and 8° C. In other embodiments, the operating temperature may be between 0° C. and 4.5° C. In still other embodiments, the operating temperature may be between 2° C. and 6° C. In further embodiments, the operating temperature may be between 3° C. and 5° C.

In some embodiments, the operating temperature may be measured at the intake 126. In other embodiments, the operating temperature may be measured at the exhaust 128. In still other embodiments, the operating temperature may be measured where the air exits the chiller 123. In yet other embodiments, the operating temperature may be measured at any point between the chiller and the exhaust. In some embodiments, a chilled portion of the volume of air 124 may increase in temperature in the ducting or tubing between the chiller 123 and the intake 126. Therefore, measuring the operating temperature at the intake 126 may result in air that first encounters grain at or near the operating temperature.

In some embodiments, a feedback loop may be established between the intake 123 and the chiller 126. An operating temperature may be measured at the intake 123. If the operating temperature is lower than an optimal operating temperature, then the chiller 126 may be instructed to reduce the temperature of the portion of the volume of air 124 chilled. Similarly, if the operating temperature is higher than the optimal operating temperature, then the chiller 126 may be instructed to increase the temperature of the portion of the volume of air 124 to be chilled. This feedback loop may be established using control equipment known in the art.

Figures 1, 2:
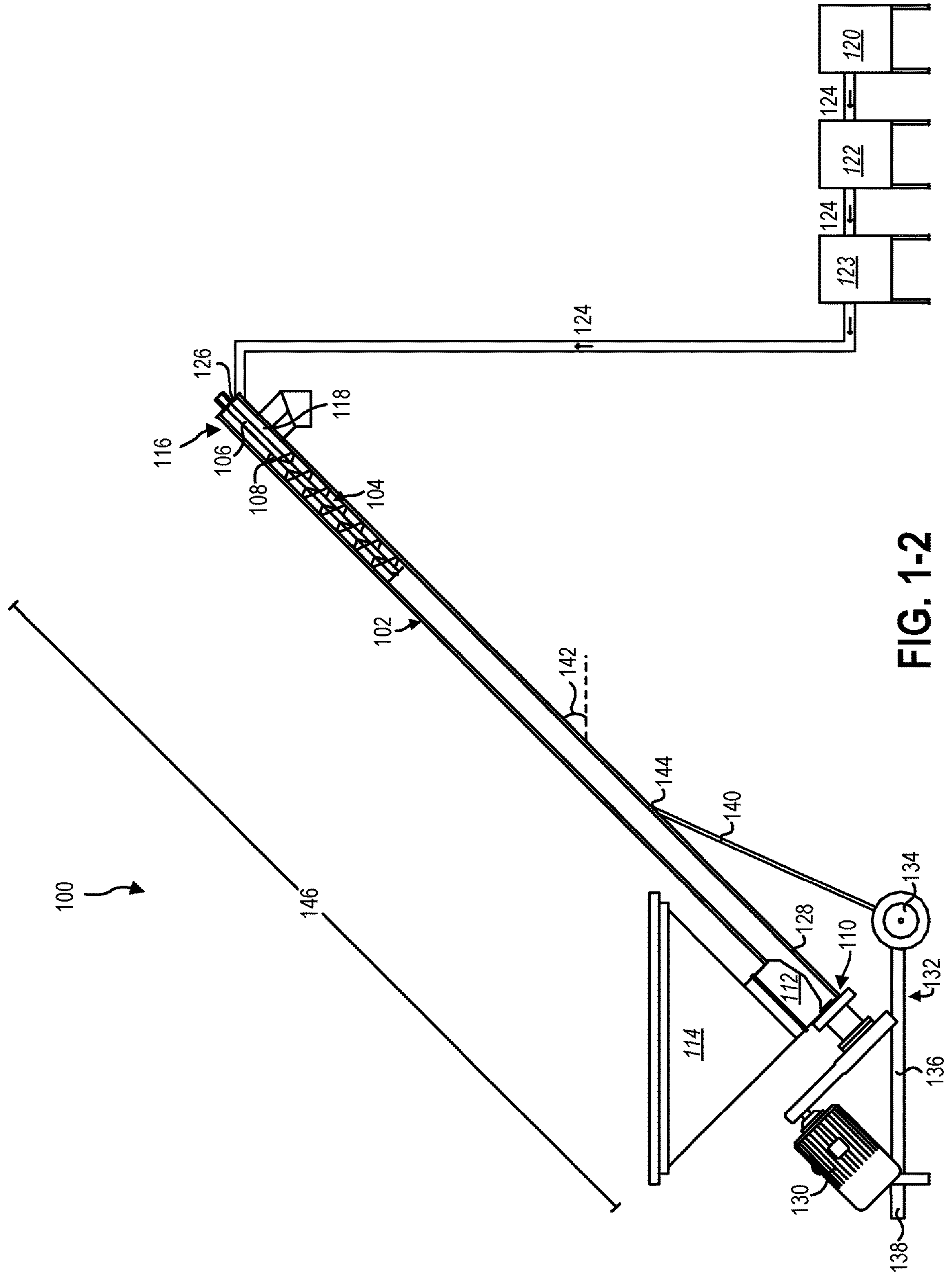

Referring now to FIG. 1-2, in some embodiments, the volume of air 124 may flow from the ventilation device 120, through the dehumidifying unit 122 and the chiller 123 and into an intake 126 located at the second end 116 of the drum 102. In some embodiments, the intake 126 may be located at or near the grain outlet 118. The volume of air 124 may flow through the drum to an exhaust 128 located at the first end 110 of the drum 102. In this manner, a portion of the volume of air 124 may be chilled to the operating temperature in the chiller 123, and thus enter the second end 116 of the drum 102 at the operating temperature, or at approximately the operating temperature. As the chilled portion of the volume of air 124 passes through the drum 102, it may be diverted by the grain auger 104. Grain traveling through the drum 102 on the grain auger 104 may thus encounter the coolest and driest air close to the grain outlet 118. As the volume of air 124 travels through the drum 102, the grain traveling through the drum 102 may release moisture into the volume of air 124. In some embodiments, the grain traveling through the drum 102 may be warmer than the operating temperature, thereby warming the temperature of at least a portion of the volume of air 124 such that a first temperature at the intake 126 may be less than a second temperature at the exhaust 128.

The use of the grain drying apparatus 100 may increase overall crop yield for the grain or material to be dried. For example, conventional harvesting of grain occurs after the grain has dried in the field for a time, which often kills the original plant. The increased efficiency obtained by the grain drying apparatus 100 may, in some instances, allow grain to be harvested before the original plant dies. For example, if wheat berries are harvested before the host grass dies, the host grass may produce an additional crop. In this manner, a single plant may yield multiple crops before replanting is necessary. In some embodiments, a method for harvesting multiple crops may include using one or more embodiments of a grain drying apparatus as described herein. For example, a method may include harvesting a first crop using one or more embodiments of a grain drying apparatus as described herein and subsequently within the same growing season, harvesting a second crop using one or more embodiments of a grain drying apparatus as described herein.

FIG. 2-1 represents a lateral cross-sectional view of a grain auger 204-1, showing a flight of the flighting 208-1, according to at least one embodiment of the present disclosure. In some embodiments, the grain auger 204-1 may include a plurality of air holes 248-1. In some embodiments, the plurality of air holes 248-1 may be perforated in the fighting 208-1, installed by punching a perforating tool through the fighting 208-1. In other embodiments, the plurality of air holes 248-1 may be cut into the flighting 208-1. In some embodiments, the plurality of air holes 248-1 may have a minimum dimension, which may be the smallest of cross sections measured across an air hole of the plurality of air holes 248-1. In some embodiments, the minimum dimension may be less than the size of an individual grain. In this manner, the plurality of air holes 248-1 may pass the volume of air through them, while blocking the passing of individual grains or portions of grains.

In some embodiments, the minimum dimension may be in a range having an upper value, a lower value, or upper and lower values including any of 0.5 millimeters, 1.0 millimeters, 1.5 millimeters, 2.0 millimeters, 2.5 millimeters, 3.0 millimeters, 3.5 millimeters, 4.0 millimeters, or any values therebetween. For example, the air minimum dimension may be greater than 0.5 millimeters. In other examples, the minimum dimension may be less than 4.0 millimeters. In yet other examples, the minimum dimension may be in a range of 0.5 millimeters and 4.0 millimeters.

In some embodiments, the plurality of air holes 248-1 may extend from the shaft 206 to an outer edge 250 of the flighting 208-1. In other embodiments, the plurality of air holes 248-1 may extend part of the way from the shaft 206 to the outer edge 250 of the fighting 208-1. In still other embodiments, the plurality of air holes 248-1 may extend part of the way from the outer edge 250 of the fighting 208-1 to the shaft 206. In yet other embodiments, the plurality of air holes 248-1 may be located between the shaft 206 and the outer edge 250.

In some embodiments, the plurality of air holes 248-1 may be circular. In some embodiments, the plurality of air holes 248-1 may be arranged in a grid structure. In other embodiments, the plurality of air holes 248-1 may be arranged in concentric rows arranged around the shaft 206. In still other embodiments, the plurality of air holes 248-1 may be arranged in radial lines extending from the shaft 206 to the outer edge 250. In yet other embodiments, the plurality of air holes 248-1 may be arranged in a random or semi-random arrangement.

In some embodiments, the plurality of air holes may be non-circular. Referring now to FIG. 2-2, in some embodiments the plurality of air holes 248-2 may be square or rectangular. The plurality of air holes 248-2 may be arranged in radial lines between the shaft 206 and the outer edge 250. In some embodiments, the long axis of rectangular holes in the plurality of air holes 248-2 may be aligned with the radius of the flighting 208-2. In some embodiments, the plurality of air holes may be arranged as concentric rings having a fixed width equal to the minimum dimension, concentric around the shaft 206.

In some embodiments, the fighting may include a combination of differently-shaped air holes. For example, the flighting may include both circular and rectangular holes. In other examples, the fighting may include other shaped air holes, the shapes being triangular, elliptical, irregular, or polygonal of any number of sides. In some embodiments, the fighting may include a plurality of air holes with differing minimum dimensions.

Figures 1, 2:
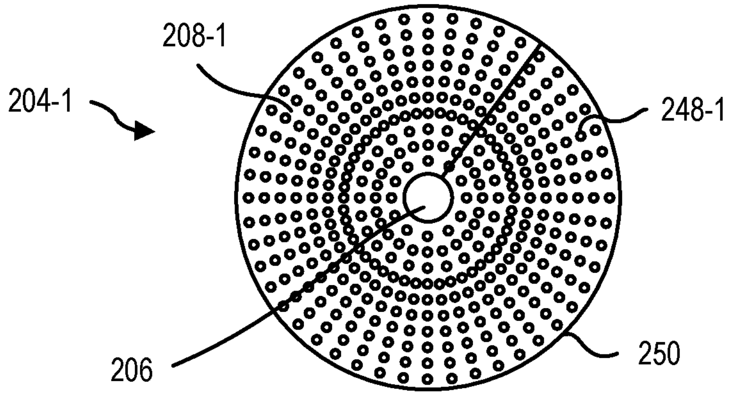
Figure 2:
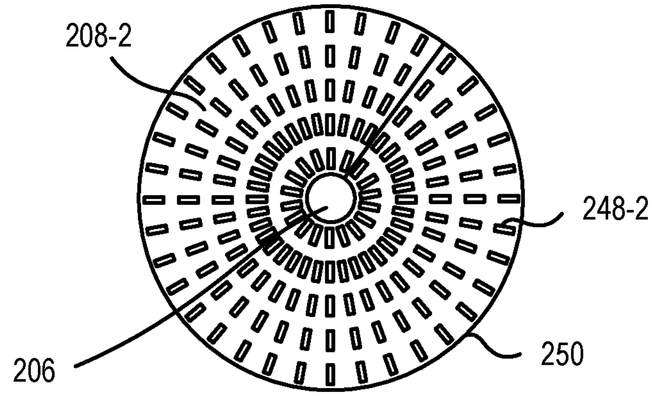
Figures 2, 3:
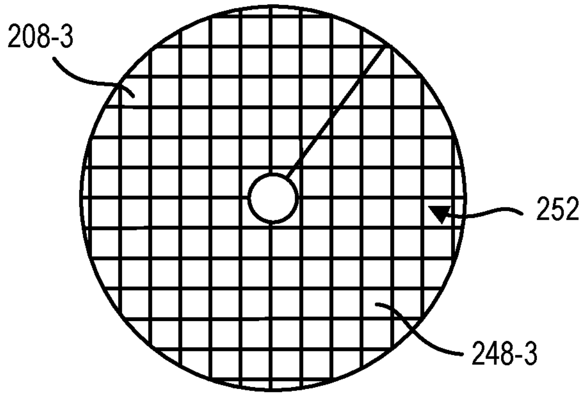
Figure 3:
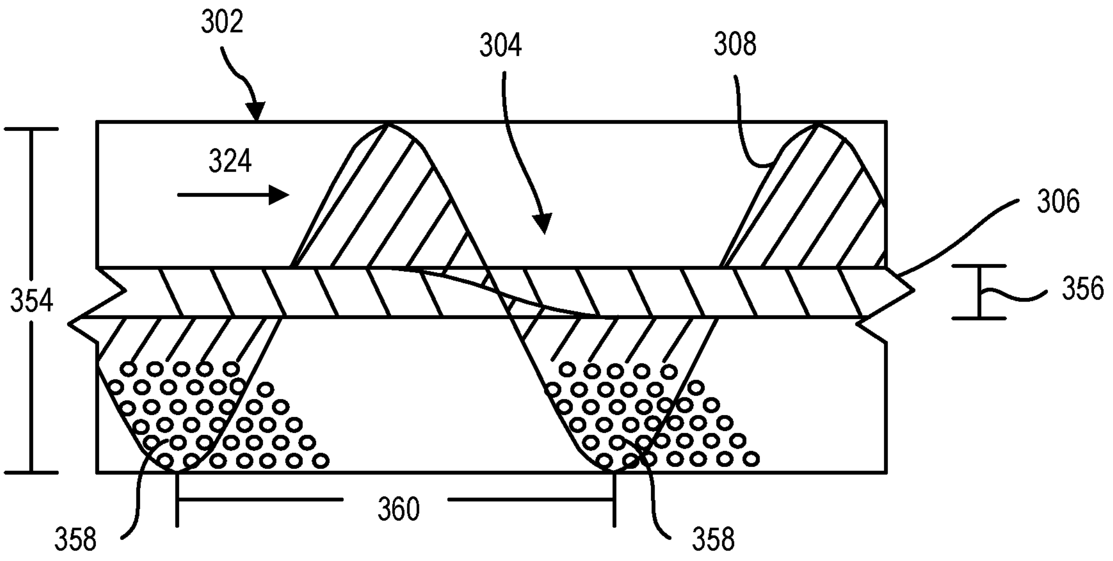

Referring now to FIG. 2-3, in some embodiments, the fighting 208-3 may include a wire mesh 252. The gaps between wire strands in the wire mesh 252 may form the plurality of air holes 248-3. In some embodiments, the wire mesh 252 may extend from the shaft 206 to the outer edge 250 of the flighting 208-3. In other embodiments, the wire mesh 252 may extend partially from the shaft 206 to the outer edge 250 of the flighting 208-3. In still other embodiments, the wire mesh 252 may extend partially from the outer edge 250 to the shaft 206. In still other embodiments, the wire mesh 252 may be located in the center of the fighting 208-3. In some embodiments, the flighting 208-3 may include a combination of wire mesh 252 and a plurality of air holes 248-3.

In some embodiments, the plurality of air holes may be located along an entirety of the flighting. In other embodiments, the plurality of air holes may be located along a portion of the fighting at the grain outlet (e.g., grain outlet 118 of FIG. 1-1). In still other embodiments, the plurality of air holes may be located along a portion of the flighting at the grain inlet (e.g., grain inlet 112 of FIG. 1-1). The plurality of air holes may be located at the grain outlet 118 along of a portion of the length of the flighting in a range having an upper value, a lower value, or upper and lower values including any of 0%, 10%, 20%, 30%, 40%, 50%, 60%, 70%, or any values therebetween. For example, the portion of the length of the fighting including the plurality of air holes may be greater than 0%. In other examples, the portion of the length of the flighting including the plurality of air holes may be less than 70%. In yet other examples, the portion of the length of the flighting including the plurality of air holes may be in a range of 0% to 70%. In some examples, the plurality of holes may extend from the inlet (e.g., the inlet 112 of FIG. 1-1) to the middle of the drum (e.g., the drum 102 of FIG. 1-1). In other examples, the plurality of holes may extend from the inlet past the middle of the drum.

FIG. 3 represents a longitudinal cross section of the drum 302 and the grain auger 304, according to at least one embodiment of the present disclosure. In some embodiments, the drum 302 may have a drum diameter 354 in a range having an upper value, a lower value, or upper and lower values including any of 10 centimeters, 15 centimeters, 20 centimeters, 25 centimeters, 30 centimeters, 35 centimeters, 40 centimeters, 45 centimeters, 50 centimeters, 55 centimeters, 60 centimeters, or any values therebetween. For example, the drum diameter 354 may be greater than 10 centimeters. In other examples, the drum diameter 354 may be less than 60 centimeters. In yet other examples, the drum diameter 354 may be in a range of 10 centimeters to 60 centimeters. In some embodiments, the flighting 308 may have a diameter approximately equal to the drum diameter 354. In other embodiments, the fighting 308 may have a diameter that is less than the drum diameter 354.

In some embodiments, the shaft 106 may have a shaft diameter 356 in a range having an upper value, a lower value, or upper and lower values including any of 0.0 centimeters, 0.5 centimeters, 1.0 centimeters, 1.5 centimeters, 2.0 centimeters, 2.5 centimeters, 3.0 centimeters, 3.5 centimeters, 4.0 centimeters, 4.5 centimeters, 5.0 centimeters, or any values therebetween. For example, the shaft diameter 356 may be greater than 0.0 centimeters. In other examples, the shaft diameter 356 may be less than 5.0 centimeters. In yet other examples, the shaft diameter 356 may be in a range of 0.0 centimeters to 5.0 centimeters.

In some embodiments, the fighting 308 may have a pitch 360 in a range having an upper value, a lower value, or upper and lower values including any of 10 centimeters, 15 centimeters, 20 centimeters, 25 centimeters, 30 centimeters, 35 centimeters, 40 centimeters, 45 centimeters, 50 centimeters, or any values therebetween. For example, the pitch 360 may be greater than 10 centimeters. In other examples, the pitch 360 may be less than 50 centimeters. In yet other examples, the pitch 360 may be in a range of 10 centimeters to 50 centimeters. In some embodiments, the pitch 360 may be approximately equal to the drum diameter 354. In other embodiments, the pitch 360 may be greater than the drum diameter 354. In still other embodiments, the pitch 360 may be less than the drum diameter 354.

In some embodiments, the volume of air 324 may pass through the drum 302 through the plurality of air holes in the fighting 308. In some embodiments, the volume of air 324 may pass through the drum 302 in a helical path defined by the grain auger 304. In some embodiments, the volume of air 324 may pass through the grain 358. In some embodiments, the volume of air 324 may pass through the drum 302 using a combination of two or more of a helical path defined by the grain auger 304, the plurality of air holes in the fighting 308, and through the grain 358. For example, the volume of air 324 may pass through the plurality of air holes in the fighting 308 and through the grain 358 on the other side of the fighting 308. In other examples, the fighting 308 may be solid, and the volume of air 324 may travel through the drum 302 in a helical path, which may force the volume of air 324 to pass through the grain 358 at each flight.

In some embodiments, the grain 358 may fill the drum 302 to the shaft 306. In some embodiments, the grain 358 may completely fill at least a portion of the drum 302, which may force at least a portion of the volume of air 324 to travel through the grain 358.

Figure 4:
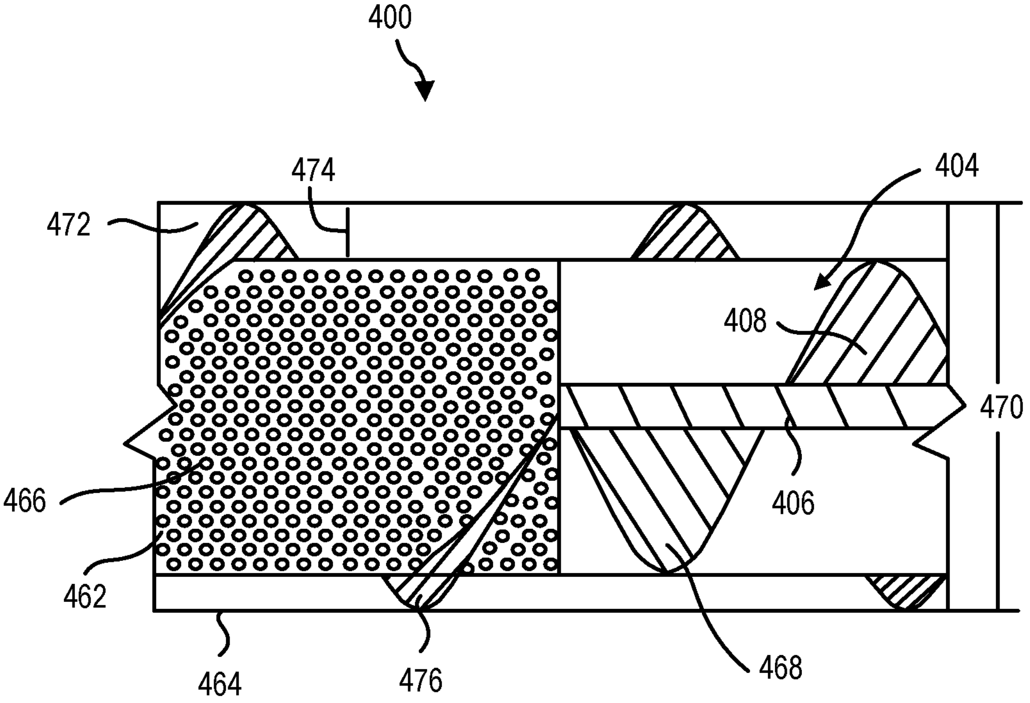
FIG. 4 is a longitudinal cross-sectional segment view of an outer drum, an inner drum, and a grain auger according to at least one embodiment of the present disclosure.

Referring now to FIG. 4, in some embodiments, the grain drying apparatus 400 may include an inner drum 462 and an outer drum 464. The inner drum 462 may include a grain auger 404 with a shaft 406 and a fighting 408. In some embodiments, the inner drum 462 may be a drum and grain auger as described in relation to FIG. 1-1 through FIG. 3. In some embodiments, a wall of the inner drum 462 may include a plurality of drum air holes 466. In some embodiments, the drum air holes 466 may extend along the inner drum 462 for an entirety of its length. In other embodiments, the drum air holes 466 may extend along a portion of the length of the inner drum 462 in a range having an upper value, a lower value, or upper and lower values including any of 0%, 10%, 20%, 30%, 40%, 50%, 60%, 70%, or any values therebetween. For example, the portion of the length of the inner drum 462 with drum air holes 466 may be greater than 0%. In other examples, the portion of the length of the inner drum 462 with drum air holes 466 may be less than 70%. In yet other examples, the portion of the length of the inner drum 462 with drum air holes 466 may be in a range of 0% to 70%.

In some embodiments, the portion of the length of the inner drum 462 that includes drum air holes 466 may be at the grain inlet (e.g., grain inlet 112 of FIG. 1-1), the grain outlet (e.g., grain outlet 118 of FIG. 1-2), or between the grain inlet and the grain outlet. For example, the drum air holes 466 may extend along 30% of the drum starting at the grain inlet. In other examples, the drum air holes 466 may extend along 60% of the drum starting at the grain outlet. In still other examples, the drum air holes 466 may extend along 10% of the drum between the grain inlet and the grain outlet. In some embodiments, the drum air holes 466 may be located at multiple locations along the inner drum 462. For example, the drum air holes 466 may be located at both the grain inlet and the grain outlet, with a solid wall of the air drum located between the drum air holes. In other examples, the drum air holes 466 may follow a helical path around the wall of the inner drum 462 that matches the carrying edge 468 of the fighting 408.

In some embodiments, the drum air holes 466 may extend around an entirety of the circumference of the inner drum 462. In other embodiments, the drum air holes may extend around a portion of the circumference of the inner drum 462 in a range having an upper value, a lower value, or upper and lower values including any of 0%, 10%, 20%, 30%, 40%, 50%, 60%, 70%, or any values therebetween. For example, the portion of the circumference of the inner drum 462 with drum air holes 466 may be greater than 0%. In other examples, the portion of the circumference of the inner drum 462 with drum air holes 466 may be less than 70%. In yet other examples, the portion of the circumference of the inner drum 462 with drum air holes 466 may be in a range of 0% to 70%.

In some embodiments, the plurality of drum air holes 466 may be perforated in the inner drum 462, installed by punching through the wall of the inner drum 462 with a perforation tool. In other embodiments, the plurality of drum air holes 466 may be cut into the wall of the inner drum 462. In some embodiments, the plurality of drum air holes 466 may have a minimum dimension, which may be the smallest of cross sections measured across a drum air hole of the plurality of drum air holes 466. In some embodiments, the minimum dimension may be less than the size of an individual grain. In this manner, the volume of air may pass through the plurality of drum air holes 466, while blocking the passing of grains.

In some embodiments, the minimum dimension may be in a range having an upper value, a lower value, or upper and lower values including any of 0.5 millimeters, 1.0 millimeters, 1.5 millimeters, 2.0 millimeters, 2.5 millimeters, 3.0 millimeters, 3.5 millimeters, 4.0 millimeters, 4.5 millimeters, 5.0 millimeters, or any values therebetween. For example, the air minimum dimension may be greater than 0.5 millimeters. In other examples, the minimum dimension may be less than 5.0 millimeters. In yet other examples, the minimum dimension may be in a range of 0.5 millimeters and 5.0 millimeters.

Still referring to FIG. 4, in some embodiments, the minimum dimension may prevent individual grains from passing through the inner drum 462, but may allow smaller particles to pass through the drum air holes 466. Such smaller particles may include dust, broken grains, grain germ, grain bran, pebbles, grain husk, and so forth. In some embodiments, the minimum dimension may be sized to prevent passing of a first grain through the drum air holes 466, but may allow passing of a second grain through the drum air holes 466. In this manner, the inner drum 462 may function as a separator to separate grains and/or other particles during drying.

In some embodiments, the plurality of drum air holes 466 may be circular. In other embodiments, the plurality of drum air holes may be non-circular. For example, the plurality of drum air holes 466 may be square or rectangular. In some embodiments, the plurality of drum air holes 466 may be arranged in circumferential rows arranged around the inner drum 462. In some embodiments, the long axis of rectangular holes in the plurality of drum air holes 466 may be aligned with the circumference of the inner drum 462. In other embodiments, the long axis of rectangular holes may be aligned with the longitudinal axis of the inner drum 462. In still other embodiments, the long axis of rectangular holes may be aligned with the wrap of the fighting 408. In other embodiments, the plurality of drum air holes 466 may be arranged in a random or semi-random arrangement.

In some embodiments, the inner drum 462 may include a combination of differently shaped air holes. For example, the inner drum 462 may include both circular and rectangular holes. In other examples, the inner drum 462 may include other shaped air holes, the other shapes being triangular, elliptical, irregular, or polygonal of any number of sides. In some embodiments, the inner drum 462 may include a plurality of drum air holes 466 with differing minimum dimensions.

In some embodiments, the inner drum may include a wire mesh. The gaps between wire strands in the wire mesh may form the plurality of drum air holes. In some embodiments, the entire inner drum may be formed from wire mesh. In other embodiments, the wire mesh may extend partially between the grain inlet and the grain outlet in a range having an upper value, a lower value, or upper and lower values including any of 0%, 10%, 20%, 30%, 40%, 50%, 60%, 70%, or any values therebetween. For example, the extent of the wire mesh between the grain inlet and the grain outlet may be greater than 0%. In other examples, the extent of the wire mesh between the grain inlet and the grain outlet may be less than 70%. In yet other examples, the extent of the wire mesh between the grain inlet and the grain outlet may be in a range of 0% to 70%. In some embodiments, the inner drum may include a combination of wire mesh and a plurality of drum air holes.

In some embodiments, the outer drum 464 may have a larger outer drum diameter 470 than the inner drum diameter. For example, the outer drum 464 may surround the inner drum 462. In some examples, the outer drum 464 may completely enclose the inner drum 462. In other examples, the outer drum 464 may surround the inner drum 462 for a portion of the length of the inner drum 462. In some embodiments, the outer drum 464 may have an outer drum diameter 470 in a range having an upper value, a lower value, or upper and lower values including any of 10 centimeters, 15 centimeters, 20 centimeters, 25 centimeters, 30 centimeters, 35 centimeters, 40 centimeters, 45 centimeters, 50 centimeters, 55 centimeters, 60 centimeters, 65 centimeters, 70 centimeters, or any values therebetween. For example, the outer drum diameter 470 may be greater than 10 centimeters. In other examples, the outer drum diameter 470 may be less than 70 centimeters. In yet other examples, the outer drum diameter 470 may be in a range of 10 centimeters to 70 centimeters.

Still referring to FIG. 4, an annulus 472 may exist between the inner drum 462 and the outer drum 464, having an annulus width 474. In some embodiments, the annulus width 474 may be in a range having an upper value, a lower value, or upper and lower values including any of 2.0 centimeters, 3.0 centimeters, 4.0 centimeters, 5.0 centimeters, 6.0 centimeters, or any values therebetween. For example, the annulus width 474 may be greater than 2.0 centimeters. In other examples, the annulus width 474 may be less than 6.0 centimeters. In yet other examples, the annulus width 474 may be in a range of 2.0 centimeters to 6.0 centimeters.

In some embodiments, the annulus 472 may include a helical air diverter 476. The helical air diverter 476 may be wrapped in a helical shape between the inner drum 462 and the outer drum 464. In some embodiments, the helical air diverter 476 may be connected to the inner drum 462. In other embodiments, the helical air diverter 476 may be connected to the outer drum 464. In some embodiments, the helical air diverter 476 may be connected to both the inner drum 462 and the outer drum 464, which may result in the inner drum 462 being rotationally fixed to the outer drum 464. In some embodiments, the helical air diverter 476 may have a height approximately equal to that of the annulus width 474.

In some embodiments, the helical air diverter 476 may be wound in a different direction than the fighting 408. For example, the helical air diverter 476 may have a left-handed wrap, and the flighting 408 may have a right-handed wrap. In other examples, the helical air diverter 476 may have a right-handed wrap and the flighting 408 may have a left-handed wrap. In other embodiments, the helical air diverter 476 may be wound in the same direction as the flighting 408. For example, both the helical air diverter 476 and the fighting 408 may have a right-handed wrap. In other examples, both the helical air diverter 476 and the fighting 408 may have a left-handed wrap.

In some embodiments, the plurality of drum air holes 466 may follow a helical path close to that of the helical air diverter 476. In some embodiments, the plurality of drum air holes 466 may be located upwind of the helical air diverter 476.

In some embodiments, the helical air diverter 476 may have a pitch that is approximately equal to that of the flighting 408. In other embodiments, the helical air diverter 476 may have a pitch that is less than that of the fighting 408. In other embodiments, the helical air diverter 476 may have a pitch that is greater than that of the flighting 408. The helical air diverter may have a pitch in a range having an upper value, a lower value, or upper and lower values including any of 10 centimeters, 15 centimeters, 20 centimeters, 25 centimeters, 30 centimeters, 35 centimeters, 40 centimeters, 45 centimeters, 50 centimeters, or any values therebetween. For example, the helical air diverter pitch may be greater than 10 centimeters. In other examples, the helical air diverter pitch may be less than 50 centimeters. In yet other examples, the helical air diverter pitch may be in a range of 10 centimeters to 50 centimeters.

Figure 5:
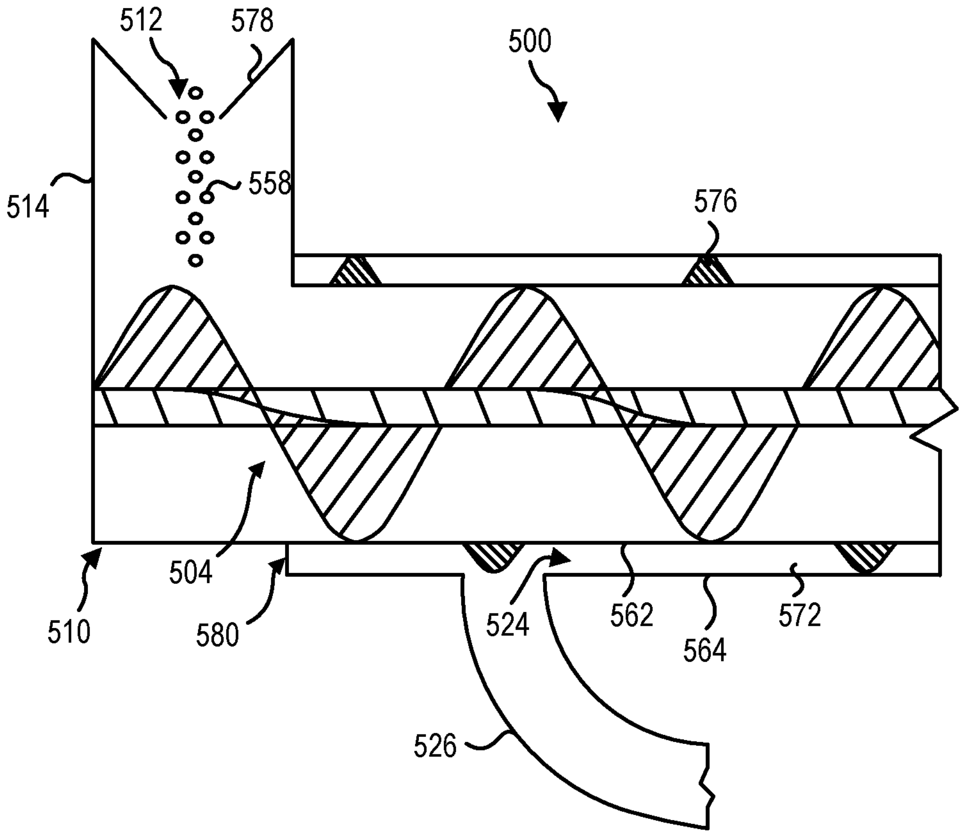
FIG. 5 is a longitudinal cross-sectional view of a grain inlet, according to at least one embodiment of the present disclosure.

Referring now to FIG. 5, a longitudinal cross-section of the first end 510 of a grain drying apparatus 500 may include a grain inlet 512, a grain auger 504, an inner drum 562 and an outer drum 564. An annulus 572 between the inner drum 562 and the outer drum 564 may include a helical air diverter 576. In some embodiments, grain 558 may be loaded into the inner drum 562 through a hopper 514 connected to the grain inlet 512.

In some embodiments, an intake 526 may be in fluid communication with a ventilation device (e.g., ventilation device 120 of FIG. 1-1), dehumidifying unit (e.g., dehumidifying unit 122 of FIG. 1-1), a chiller (e.g., chiller 123 of FIG. 1-1), and the annulus 572. The intake 526 may be connected to the outer drum 564 and divert a volume of air 524 into the annulus 572. In some embodiments, a hopper seal 578 may be located in the hopper 514. The hopper seal 578 may increase the resistance between the intake 526 and the grain inlet 512. In some embodiments, an increased resistance between the intake 526 and the grain inlet 512 may reduce the amount of the volume of air 524 that is short-circuited out the grain inlet 512 and hopper 514. This, in turn, may force more of the volume of air 524 through the plurality of drum air holes (e.g., drum air holes 466 of FIG. 4) in the inner drum 562 and into the interior of the inner drum 562. In some embodiments, the helical air diverter 576 may divert the volume of air 524 around the annulus 572 across the length of the inner drum 562. In some embodiments, diverting the volume of air 524 may distribute the volume of air 524 approximately equally through the inner drum 562. In some embodiments, the volume of air 524 may pass through the grain drying apparatus 500 through both the annulus 572 and the interior of the inner drum 562.

In some embodiments, the hopper seal 578 may be a trap-door or latch that may be opened when grain is added to the grain drying apparatus 500. In other embodiments, the hopper seal 578 may include two doors or seals. Grain may be added to a hopper staging area, through a first open door. After an amount of grain is added to the hopper staging area, the first door may close, and a second door may open, which may dump the amount of grain into the grain inlet 512. In this manner, grain may be continuously dried in the grain drying apparatus 500 with a minimal volume of air short-circuiting through the grain inlet 512 while grain is loaded. In some embodiments, the outer drum 564 may include an outer drum cap 580 at the first end 510. The outer drum cap 580 may have an air-tight seal.

Figure 6:
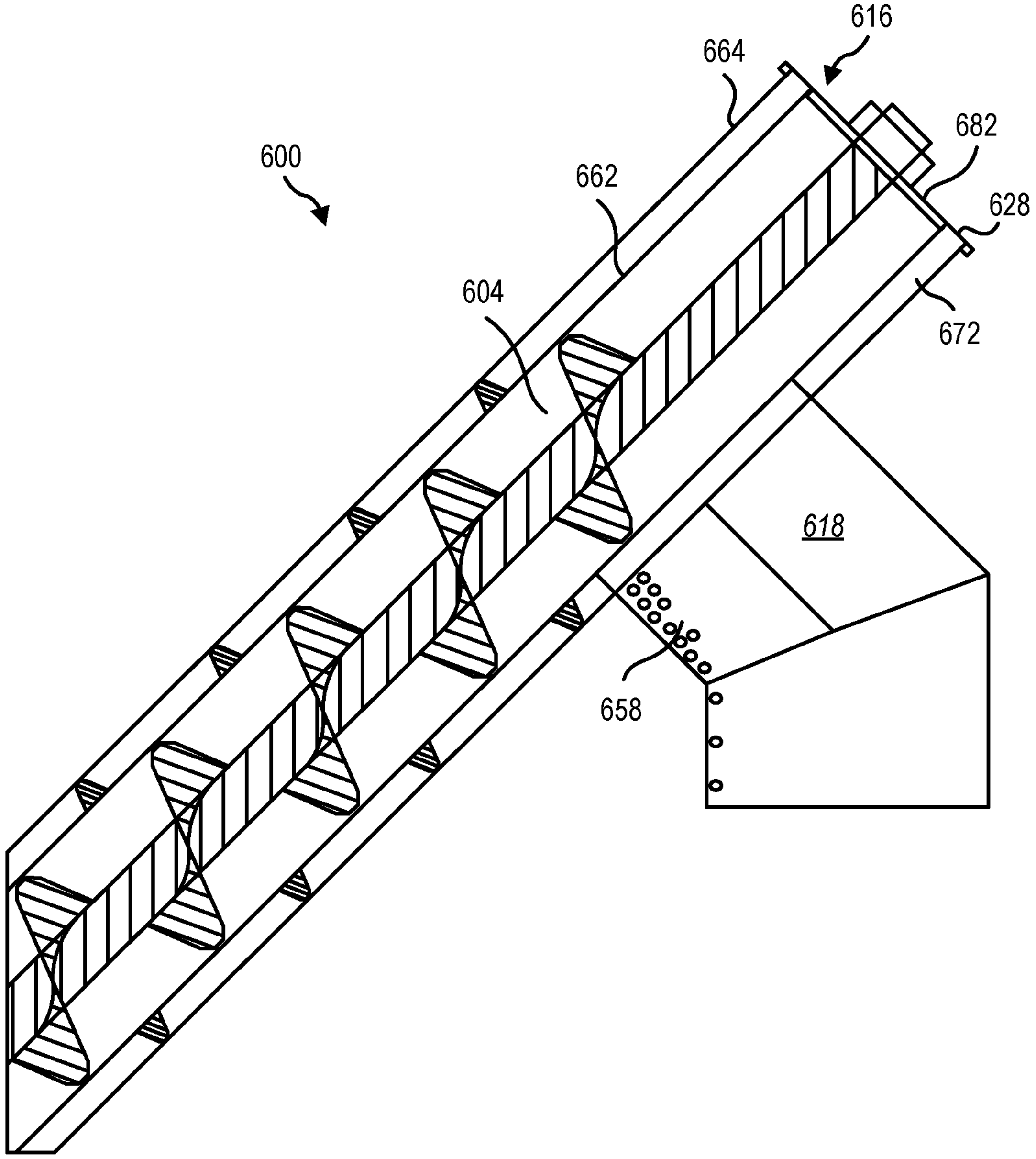
FIG. 6 is a longitudinal cross-sectional view of a grain outlet, according to at least one embodiment of the present disclosure.

Referring now to FIG. 6, a longitudinal cross-section of a second end 616 of a grain drying apparatus 600 may include an inner drum 662, an outer drum 664, a grain auger 604, and a grain outlet 618. In some embodiments, grain 658 may pass out of the grain outlet 618 after passing through the inner drum 662. In some embodiments, a cover 682 may be placed over the end of the inner drum 662. An exhaust 628 may be located at the annulus 672 at the end of the inner drum 662 and the outer drum 664. In some embodiments, the cover 682 may increase the resistance between the intake and the exhaust 628, thereby forcing air from the inner drum 662 to the outer drum 664. In some embodiments, the grain outlet 618 may also be the exhaust 628.

In some embodiments, the grain outlet 618 may include two doors or seals. Grain 658 may advance through the inner drum 662 to the grain outlet 618 and into a first outlet staging area. When an amount of grain 658 enters the first outlet staging area, a first door may open and the amount of grain 658 may enter a second staging area. Then the first door may close, and a second door may open, and the amount of grain may exit the second staging area. In this manner, grain 658 may be continuously dried in the grain drying apparatus 600 with minimal air short-circuiting through the grain outlet while grain exits the grain drying apparatus 600.

Figure 7:
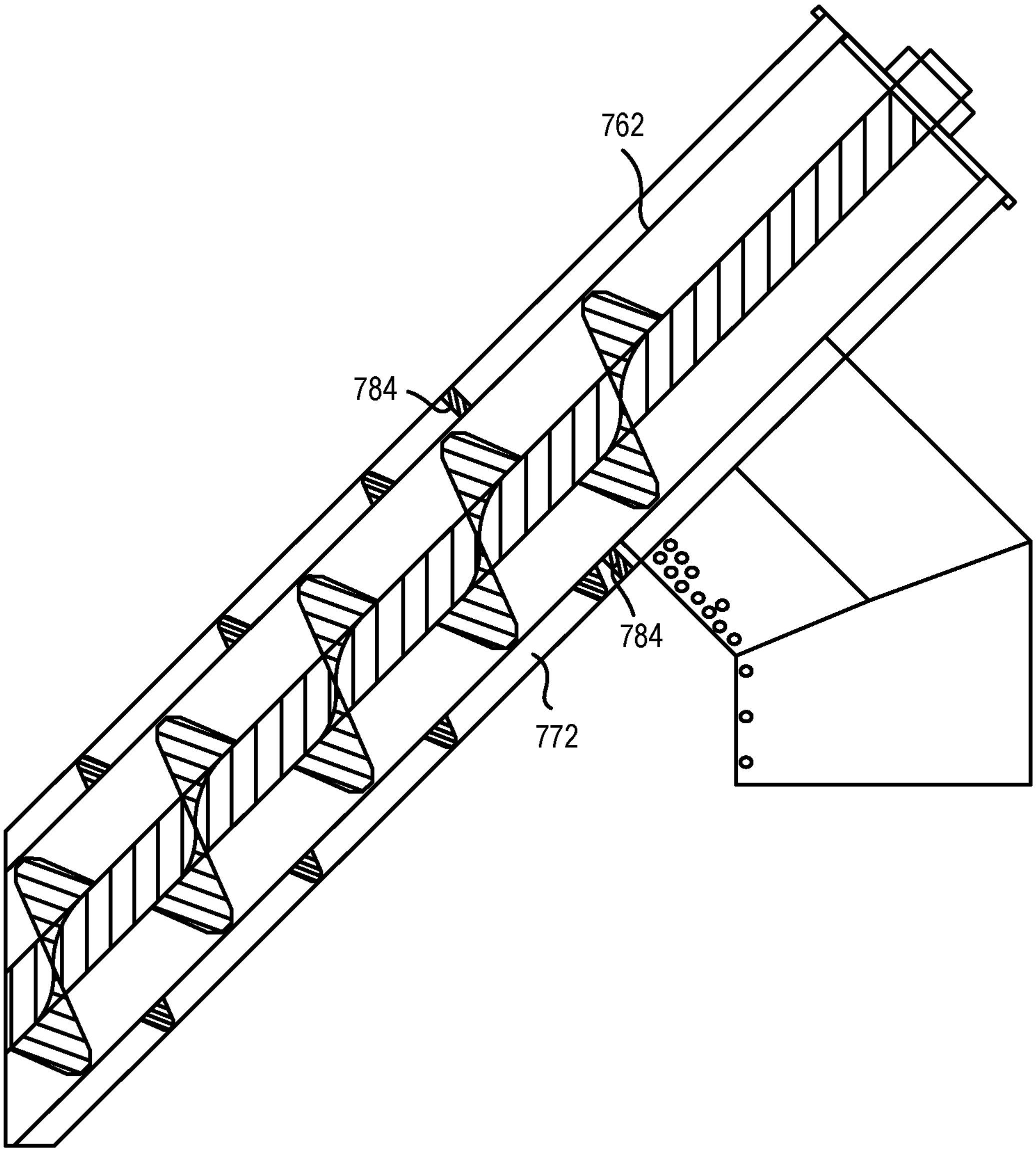
FIG. 7 is another longitudinal cross-sectional view of a grain outlet, according to at least one embodiment of the present disclosure.

Referring now to FIG. 7, in some embodiments, an annular seal 784 may be located in the annulus 772 between the intake and the grain outlet. The annular seal 784 may be airtight, forcing air from the annulus 772, through the wall of the inner drum 762, into the interior of the inner drum 762.

Figure 8:
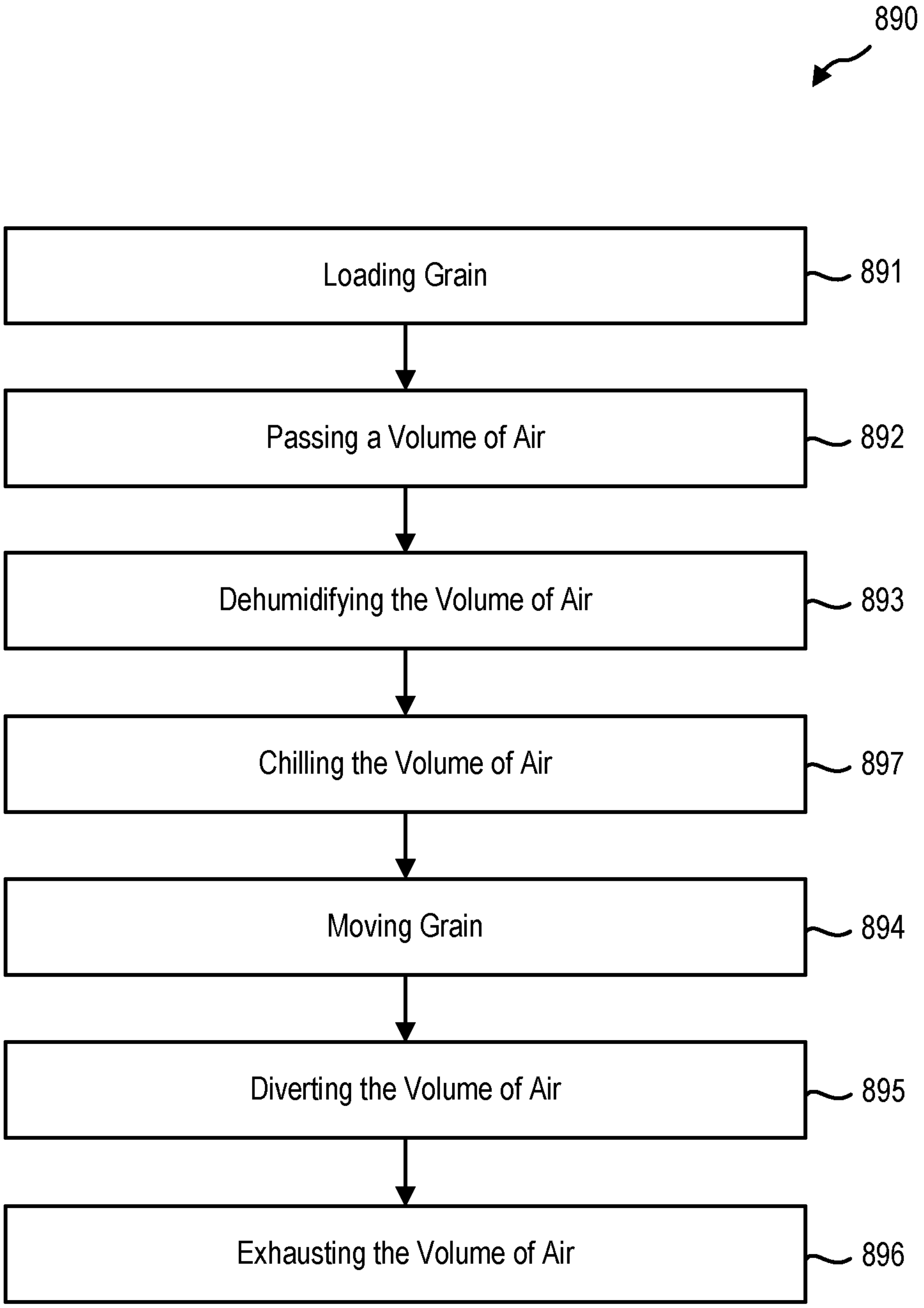
FIG. 8 is a method chart describing a method for drying grain, according to at least one embodiment of the present disclosure.

Referring now to FIG. 8, in some embodiments, a method 890 for drying material may include loading material into a material inlet at 891. The material inlet may be located at a first end of an inner drum that includes a material auger with a fighting supported by a shaft. The wall of the inner drum may include a plurality of drum air holes. In some embodiments, the method 890 may include passing a volume of air through a dehumidifying unit and a chiller to an intake located at an annulus between the inner drum and an outer drum at 892. A portion of the volume of air may be dehumidified in the dehumidifying unit using a desiccant at 893. A portion of the volume of air may be chilled in the chiller at 897. In some embodiments, a feedback loop may be established between the chiller and a measuring point, such as the intake. For example, the method 890 may include measuring a temperature of the volume of air at a measuring point and comparing the measured temperature to an optimal operating temperature. The method may further include adjusting the chiller to increase or decrease (i.e., adjust or change) the temperature of the volume of air. This process may be repeated multiple times until the volume of air reaches the optimal operating temperature. In some embodiments, the feedback loop may include a delay to allow the adjusted air to travel from the chiller to the measuring point. Thus, in some embodiments, grain may be dried in varying temperature conditions while maintaining a constant or approximately constant operating temperature.

The material may be moved through the inner drum to a second end of the inner drum by rotating the material auger at 894. In some embodiments, the method 890 may include diverting the volume of air from the annulus to the inner drum through the drum air holes at 895. The annulus may include a helical air diverter, which may assist in diverting the volume of air. In some embodiments, the volume of air may be exhausted through an exhaust at the second end of the inner drum and the outer drum at 896.

Figure 9:
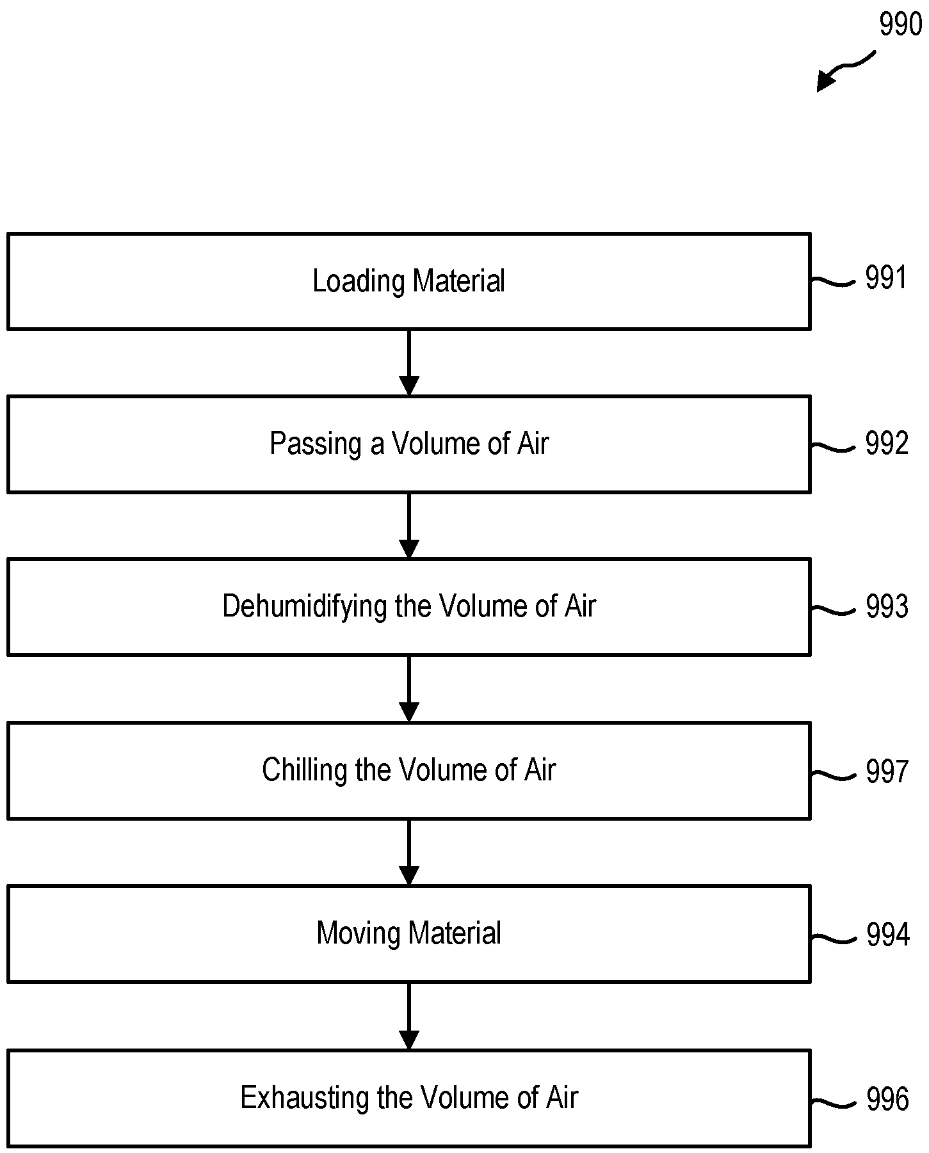
FIG. 9 is a method chart describing a method for drying grain, according to at least one embodiment of the present disclosure.

Referring now to FIG. 9, a method 990 for drying material may include loading material into a material inlet at 991. The material inlet may be located at a first end of a drum that includes an auger with a fighting supported by a shaft. In some embodiments, the method 990 may include passing a volume of air through a dehumidifying unit and a chiller to an intake located in the drum at 992. At least a portion of the volume of air may be dehumidified in the dehumidifying unit using a desiccant at 993. At least a portion of the volume of air may be chilled in the chiller at 997. The material may be moved through the drum to a second end of the drum by rotating the auger at 994. In some embodiments, the volume of air may be exhausted through an exhaust at the second end of the inner drum and the outer drum at 996.

In some embodiments, chilling the volume of air may include chilling a portion of the volume of air to between 0° C. and 8° C. as measured at a measuring point. In some embodiments, the measuring point may be at the chiller. In other embodiments, the measuring point may be at the intake. Passing the volume of air may include passing the volume of air through the intake located near the material outlet and through the drum.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A grain drying apparatus comprising:
- a drum having a drum grain inlet at a first end of the drum and a drum grain outlet at a second end of the drum;
- a grain auger inside the drum, the grain auger having a flighting supported by a shaft, wherein the flighting includes a plurality of air holes at the drum grain inlet;
- a ventilation network, including:
  - a dehumidifying unit including a desiccant;
  - a chiller;
  - an intake;
  - an exhaust;
  - a fan in fluid communication with the dehumidifying unit, the chiller, the intake, and the exhaust; and
  - a fluid path, wherein a flow of air flows along the fluid path from the fan, into the drum through the intake, and out of the drum through the exhaust, wherein the dehumidifying unit and the chiller are located on the fluid path between the fan and the intake.

2. The grain drying apparatus of claim 1, wherein the flighting includes the plurality of air holes along an entirety of a length of the flighting.

3. The grain drying apparatus of claim 1, wherein each air hole of the plurality of air holes has a minimum dimension that is less than 3 millimeters.

4. The grain drying apparatus of claim 1, wherein the exhaust exhausts to the atmosphere.

5. A grain drying apparatus comprising:
- an inner drum having a drum grain inlet at a first end of the inner drum and a drum grain outlet at a second end of the inner drum, a wall of the inner drum including a plurality of drum air holes, wherein the inner drum includes a grain auger inside the inner drum, the grain auger having a flighting supported by a shaft;
- an outer drum surrounding the inner drum;
- a helical air diverter in an annulus between the inner drum and the outer drum;
- a ventilation network, including:
  - a dehumidifying unit, wherein the dehumidifying unit includes a desiccant;
  - a chiller;
  - an intake;
  - an exhaust;
  - a fan in fluid communication with the dehumidifying unit, the chiller, the intake, and the exhaust; and
  - a fluid path, wherein a flow of air flows along the fluid path from the fan, into the outer drum through the intake, and out of the inner drum through the exhaust, wherein the dehumidifying unit and the chiller are located on the fluid path between the fan and the intake.

6. The grain drying apparatus of claim 5, wherein the flighting includes a plurality of air holes at the drum grain inlet.

7. The grain drying apparatus of claim 6, wherein the plurality of air holes are located along an entirety of a length of the flighting.

8. The grain drying apparatus of claim 5, wherein the helical air diverter is wrapped in a different direction from the flighting.

9. The grain drying apparatus of claim 5, wherein the plurality of drum air holes extend along an entirety of a length of the inner drum.

10. The grain drying apparatus of claim 5, wherein the plurality of drum air holes extend around an entirety of a circumference of the inner drum.

11. The grain drying apparatus of claim 5, wherein the intake is in fluid communication with the annulus, and the helical air diverter has a height about equal to a width of the annulus.

12. The grain drying apparatus of claim 5, wherein a volume of air has a first temperature at the intake, and a second temperature at the exhaust, the first temperature being less than the second temperature.

13. A method for drying material comprising:
- loading material into a drum material inlet at a first end of a drum, the drum including an auger inside the drum, the auger including a shaft supporting a flighting;
- passing a volume of air through a dehumidifying unit and a chiller to an intake in the drum;
- creating a chilled and dehumidified volume of air, including:
  - dehumidifying the volume of air in the dehumidifying unit, the dehumidifying unit including a desiccant;
  - chilling the volume of air in the chiller to a temperature of less than 50° C. as measured at the intake;
- passing the chilled and dehumidified volume of air through the drum;
- moving the material through the drum to a drum material outlet at a second end of the drum by rotating a material auger; and
- exhausting the volume of air through an exhaust.

14. The method of claim 13, wherein dehumidifying the volume of air includes using at least one from the group consisting of activated alumina, silica gel, or a molecular sieve as the desiccant.

15. The method of claim 13, wherein moving the material through the drum includes rotating the drum at about 5 rotations per minute.

16. The method of claim 13, wherein chilling the volume of air includes chilling the volume of air to between 0° C. and 8° C. as measured at the intake.

17. The method of claim 13, wherein passing the volume of air includes passing the volume of air through the intake located near the drum material outlet and through the drum.

18. The method of claim 13, wherein passing the volume of air includes passing the volume of air through the intake located at an annulus between the drum and an outer drum, the annulus including a helical air diverter, the drum including a plurality of drum air holes.

19. The method of claim 13, wherein the chiller continuously operates while passing the chilled and dehumidified volume of air through the drum.

20. The method of claim 13, further comprising altering a conveying capacity of the material auger to match a drying capacity of the chilled and dehumidified volume of air.

* * * * *